(12) United States Patent
Zumsteg

(10) Patent No.: US 9,619,683 B2
(45) Date of Patent: Apr. 11, 2017

(54) PORTABLE RFID READING TERMINAL WITH VISUAL INDICATION OF SCAN TRACE

(71) Applicant: HAND HELD PRODUCTS, INC., Fort Mill, SC (US)

(72) Inventor: Philip Zumsteg, Excelsior, MN (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

(21) Appl. No.: 14/982,839

(22) Filed: Dec. 29, 2015

(65) Prior Publication Data

US 2016/0188930 A1    Jun. 30, 2016

Related U.S. Application Data

(60) Provisional application No. 62/098,748, filed on Dec. 31, 2014.

(51) Int. Cl.
| | |
|---|---|
| *G06K 7/10* | (2006.01) |
| *G06K 7/14* | (2006.01) |
| *G06Q 10/08* | (2012.01) |
| *G06K 7/00* | (2006.01) |

(52) U.S. Cl.
CPC ........ *G06K 7/10366* (2013.01); *G06K 7/0004* (2013.01); *G06K 7/0008* (2013.01); *G06K 7/10881* (2013.01); *G06K 7/1413* (2013.01); *G06Q 10/087* (2013.01)

(58) Field of Classification Search
CPC ............. G06K 7/10366; G06K 7/1413; G06K 7/0004; G06K 7/0008; G06K 7/10881; G06Q 10/087
See application file for complete search history.

(56) References Cited

U.S. PATENT DOCUMENTS

| | | |
|---|---|---|
| 6,000,615 A | 12/1999 | Spitz |
| 6,318,636 B1 | 11/2001 | Reynolds et al. |
| 6,543,691 B1 | 4/2003 | Lemelson et al. |
| 6,659,344 B2 | 12/2003 | Otto et al. |
| 6,991,164 B2 | 1/2006 | Lemelson et al. |
| 7,003,138 B2 | 2/2006 | Wilson |
| 7,015,967 B1 | 3/2006 | Kochi et al. |
| 7,063,256 B2 | 6/2006 | Anderson et al. |
| 7,161,470 B2 | 1/2007 | Berquist et al. |
| 7,237,721 B2 | 7/2007 | Bilcu et al. |
| 7,243,849 B2 | 7/2007 | Lapstun et al. |
| 7,270,268 B2 | 9/2007 | Garber et al. |

(Continued)

OTHER PUBLICATIONS

May 27, 2016 Search Report issued in European Patent Application No. 15202688.6.

(Continued)

*Primary Examiner* — Kristy A Haupt
(74) *Attorney, Agent, or Firm* — Oliff PLC; R. Brian Drozd

(57) ABSTRACT

A method of reading RFID tags may include providing a device that can read barcodes and RFID tags. The barcodes may be attached to an object and respectively having a predetermined sequential read order. While reading the barcodes in the predetermined sequential read order, outputting an interrogation signal to RFID tags so that the RFID tags can be read while the barcode reader moves to sequentially read the barcodes in the predetermined sequential order.

20 Claims, 16 Drawing Sheets

(56) References Cited

U.S. PATENT DOCUMENTS

| | | |
|---|---|---|
| 7,308,158 B2 | 12/2007 | Herbert et al. |
| 7,405,662 B2 | 7/2008 | Steinke et al. |
| 7,407,096 B2 | 8/2008 | McQueen et al. |
| 7,494,063 B2 | 2/2009 | Kotlarsky et al. |
| 7,501,950 B2 | 3/2009 | Suzuki |
| 7,535,361 B2 | 5/2009 | Doan et al. |
| 7,551,090 B2 | 6/2009 | Doan et al. |
| 7,602,288 B2 | 10/2009 | Broussard |
| 7,627,191 B2 | 12/2009 | Xu et al. |
| 7,677,602 B2 | 3/2010 | Bennett et al. |
| 7,696,874 B2 | 4/2010 | Stevens |
| 7,702,187 B2 | 4/2010 | Rusman et al. |
| 7,708,205 B2 | 5/2010 | Kotlarsky et al. |
| 7,735,731 B2 | 6/2010 | Skaaksrud et al. |
| 7,756,292 B2 | 7/2010 | Lev |
| 7,756,319 B2 | 7/2010 | Odell |
| 7,786,865 B2 | 8/2010 | Park |
| 7,786,925 B1 | 8/2010 | Knibbe et al. |
| 7,815,121 B2 | 10/2010 | Kotlarsky et al. |
| 7,821,400 B2 | 10/2010 | Tabet et al. |
| 7,831,082 B2 | 11/2010 | Holsing et al. |
| 7,833,013 B2 | 11/2010 | Diers et al. |
| 7,855,643 B2 | 12/2010 | Tuttle |
| 7,857,219 B2 | 12/2010 | Lackemann |
| 7,870,999 B2 | 1/2011 | Skaaksrud et al. |
| 7,883,013 B2 | 2/2011 | Skaaksrud et al. |
| 7,886,972 B2 | 2/2011 | Skaaksrud et al. |
| 7,951,003 B2 | 5/2011 | Russell et al. |
| 7,961,908 B2 | 6/2011 | Tzur et al. |
| 7,965,186 B2 | 6/2011 | Downie et al. |
| 8,115,601 B2 | 2/2012 | Nonaka |
| 8,149,094 B2 | 4/2012 | Deoalikar et al. |
| 8,508,344 B2 | 8/2013 | Hiramatu et al. |
| 8,727,225 B2 | 5/2014 | Zumsteg et al. |
| 8,881,982 B2 | 11/2014 | Zumsteg et al. |
| 9,013,275 B2 | 4/2015 | Zumsteg |
| 9,041,518 B2 | 5/2015 | Vargas et al. |
| 9,064,254 B2 | 6/2015 | Todeschini et al. |
| 9,092,683 B2 | 7/2015 | Koziol et al. |
| 2002/0033805 A1 | 3/2002 | Fujioka et al. |
| 2002/0165758 A1 | 11/2002 | Hind et al. |
| 2004/0041029 A1 | 3/2004 | Postman et al. |
| 2005/0131645 A1 | 6/2005 | Panopoulos |
| 2005/0212676 A1 | 9/2005 | Steinberg |
| 2005/0212817 A1 | 9/2005 | Cannon et al. |
| 2006/0026961 A1 | 2/2006 | Bronicki |
| 2006/0208859 A1 | 9/2006 | Hougen et al. |
| 2006/0262961 A1 | 11/2006 | Holsing et al. |
| 2006/0266836 A1 | 11/2006 | Bilcu et al. |
| 2007/0008136 A1 | 1/2007 | Suzuki |
| 2007/0102506 A1 | 5/2007 | Stevens |
| 2007/0124216 A1 | 5/2007 | Lucas |
| 2007/0140525 A1 | 6/2007 | Kottomtharayil |
| 2007/0176572 A1 | 8/2007 | Dang et al. |
| 2007/0199995 A1 | 8/2007 | Kotlarsky et al. |
| 2007/0215706 A1 | 9/2007 | Kotlarsky et al. |
| 2008/0037899 A1 | 2/2008 | Xu et al. |
| 2008/0061937 A1 | 3/2008 | Park |
| 2008/0111661 A1 | 5/2008 | Lin et al. |
| 2008/0122785 A1 | 5/2008 | Harmon |
| 2008/0164313 A1 | 7/2008 | Kotlarsky et al. |
| 2008/0164317 A1 | 7/2008 | Kotlarsky et al. |
| 2008/0169343 A1 | 7/2008 | Skaaksrud et al. |
| 2008/0172303 A1 | 7/2008 | Skaaksrud et al. |
| 2008/0173706 A1 | 7/2008 | Skaaksrud et al. |
| 2008/0173710 A1 | 7/2008 | Skaaksrud et al. |
| 2008/0203147 A1 | 8/2008 | Skaaksrud et al. |
| 2008/0203166 A1 | 8/2008 | Skaaksrud et al. |
| 2008/0210749 A1 | 9/2008 | Skaaksrud et al. |
| 2008/0210750 A1 | 9/2008 | Skaaksrud et al. |
| 2008/0215286 A1 | 9/2008 | Mealy et al. |
| 2008/0224870 A1 | 9/2008 | Yeo et al. |
| 2008/0249899 A1 | 10/2008 | Nasser |
| 2008/0285091 A1 | 11/2008 | Skaaksrud et al. |
| 2009/0021353 A1 | 1/2009 | Nonaka |
| 2009/0040025 A1 | 2/2009 | Volpi et al. |
| 2009/0045913 A1 | 2/2009 | Nelson et al. |
| 2009/0045924 A1 | 2/2009 | Roberts, Sr. et al. |
| 2009/0121025 A1 | 5/2009 | Romanchik |
| 2009/0161964 A1 | 6/2009 | Tzur et al. |
| 2009/0243801 A1 | 10/2009 | Strzelczyk |
| 2009/0245755 A1 | 10/2009 | Lee et al. |
| 2009/0322537 A1 | 12/2009 | Tapp et al. |
| 2010/0045436 A1 | 2/2010 | Rinkes |
| 2010/0073487 A1 | 3/2010 | Sogoh et al. |
| 2010/0109844 A1 | 5/2010 | Carrick et al. |
| 2010/0109903 A1 | 5/2010 | Carrick |
| 2010/0142825 A1 | 6/2010 | Maxwell et al. |
| 2010/0148985 A1 | 6/2010 | Lin et al. |
| 2010/0201488 A1 | 8/2010 | Stern et al. |
| 2010/0201520 A1 | 8/2010 | Stern et al. |
| 2010/0220894 A1 | 9/2010 | Ackley et al. |
| 2010/0226530 A1 | 9/2010 | Lev |
| 2010/0232712 A1 | 9/2010 | Tomita et al. |
| 2010/0252621 A1 | 10/2010 | Ito et al. |
| 2010/0262554 A1 | 10/2010 | Elliott |
| 2010/0271187 A1 | 10/2010 | Uysal et al. |
| 2010/0289624 A1 | 11/2010 | Nakamura |
| 2010/0296753 A1 | 11/2010 | Ito et al. |
| 2010/0303348 A1 | 12/2010 | Tolliver et al. |
| 2010/0308964 A1 | 12/2010 | Ackley et al. |
| 2011/0052008 A1 | 3/2011 | Holsing et al. |
| 2011/0080267 A1 | 4/2011 | Clare et al. |
| 2011/0084808 A1 | 4/2011 | Tuttle |
| 2011/0115947 A1 | 5/2011 | Oh |
| 2011/0128125 A1 | 6/2011 | Kai et al. |
| 2011/0143811 A1 | 6/2011 | Rodriguez |
| 2011/0175933 A1 | 7/2011 | Soeda |
| 2011/0187600 A1 | 8/2011 | Landt |
| 2011/0205387 A1 | 8/2011 | Tzur et al. |
| 2011/0212717 A1 | 9/2011 | Rhoads et al. |
| 2011/0234398 A1 | 9/2011 | Romaine et al. |
| 2011/0266342 A1 | 11/2011 | Forster |
| 2011/0280447 A1 | 11/2011 | Conwell |
| 2011/0284625 A1 | 11/2011 | Smith et al. |
| 2011/0290883 A1 | 12/2011 | Kotlarsky et al. |
| 2011/0297654 A1 | 12/2011 | Yoshikawa et al. |
| 2011/0298610 A1 | 12/2011 | Etkin et al. |
| 2012/0091204 A1 | 4/2012 | Shi |
| 2012/0161944 A1 | 6/2012 | Chen |
| 2012/0200537 A1 | 8/2012 | Okano |
| 2013/0049962 A1 | 2/2013 | Smith et al. |
| 2013/0154809 A1 | 6/2013 | Subramanian et al. |
| 2013/0173435 A1 | 7/2013 | Cozad, Jr. |
| 2013/0194077 A1* | 8/2013 | Vargas ............... G06K 7/10386 340/10.6 |
| 2013/0277427 A1 | 10/2013 | Zumsteg et al. |
| 2013/0277430 A1 | 10/2013 | Zumsteg et al. |
| 2013/0278386 A1 | 10/2013 | Zumsteg |
| 2013/0278393 A1 | 10/2013 | Zumsteg |
| 2013/0306720 A1 | 11/2013 | Todeschini et al. |
| 2014/0014724 A1 | 1/2014 | Koziol et al. |
| 2014/0022608 A1 | 1/2014 | Yasuzaki |
| 2014/0027503 A1 | 1/2014 | Kennedy et al. |
| 2014/0097247 A1* | 4/2014 | Zumsteg ............ G06K 7/10099 235/440 |
| 2014/0104416 A1 | 4/2014 | Giordano et al. |
| 2014/0203079 A1 | 7/2014 | Zumsteg et al. |
| 2015/0254607 A1 | 9/2015 | Vargas et al. |
| 2016/0034724 A1 | 2/2016 | Zumsteg |

OTHER PUBLICATIONS

EPC Global; Specification for RFID Air Interface; EPC Radio-Frequency Identity Protocols Class-1 Generation-2 UHF RFID Protocol for Communications at 860 MHz-960 MHz; Version 1.0.9; Jan. 31, 2005; pp. 1-94.

May 2, 2016 US Office Action Issued in U.S. Appl. No. 14/862,702.

* cited by examiner

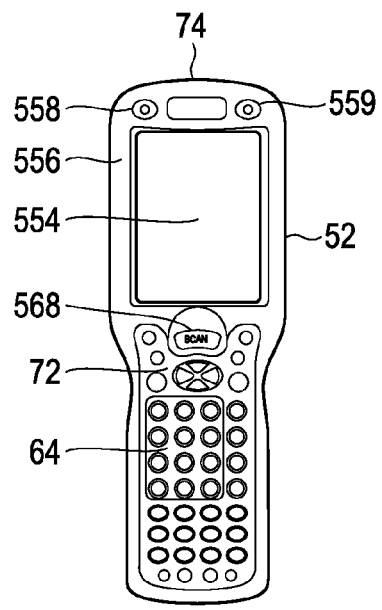
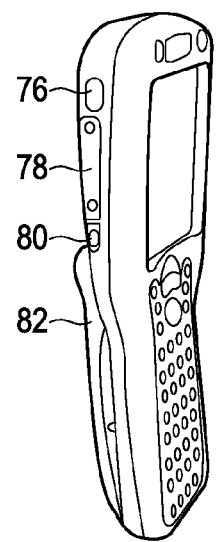
FIG. 20A  FIG. 20B
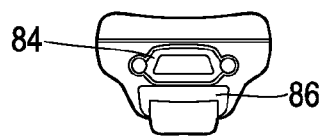
FIG. 20C

| BARCODE LABEL | TIMESTAMP (seconds) |
|---|---|
| S1,L | 00:05 |
| S1,R | 00:10 |
| S2,R | 00:12 |
| S2,L | 00:18 |
| S3,L | 00:20 |
| S3,R | 00:29 |

PORTABLE RFID READING TERMINAL WITH VISUAL INDICATION OF SCAN TRACE

CROSS-REFERENCE TO RELATED APPLICATION

This nonprovisional application claims the benefit of U.S. Provisional Application No. 62/098,748 filed Dec. 31, 2014.

FIELD

Embodiments of the invention are generally related to encoded information reading (EIR) terminals and is specifically related to RFID reading terminals including radio-frequency identification (RFID) reading devices.

BACKGROUND

RFID methods are widely used in a number of applications, including smart cards, item tracking in manufacturing, inventory management in retail, etc. An RFID tag can be attached, e.g., to an inventory item. An RFID reading terminal can be configured to read the memory of an RFID tag attached to an inventory item.

Additionally, in a retail sales environment, the use of handheld RFID reading devices to perform department inventory offers the potential benefits of performing such inventory operations more quickly than manual inventorying and hence at a lower cost, as well as improving the accuracy of inventory counts.

However, there are drawbacks to this approach. Indeed, studies have shown these potential benefits of using RFID methods are only partially realized, mainly due to incomplete coverage of merchandise on fixtures in the retail department. As a result, inaccurate inventory counts are recorded using at least some RFID methods, leading to sub-optimal revenue (i.e. due to over- or under-stocking resulting from the inaccurate inventory counts).

What is needed is a system and method for determining what portions of a given retail fixture have been properly inventoried using a handheld RFID reader. Such a system would ideally be easily integrated into existing handheld RFID reader products. As a result, the potential benefits of using handheld RFID reading devices for inventory operations will be realized to a much greater extent, increasing the revenue of the retail establishment.

SUMMARY

In one embodiment, there is provided a portable radio-frequency identifier (RFID) reading terminal comprising a microprocessor, a memory, an RFID reading device including a radio frequency (RF) antenna, and a display. The portable RFID reading terminal can be configured to display a scan trace provided by a line comprising a plurality of time varying points. Each point can be defined by a projection of the coverage shape of an RF signal transmitted by the RFID reading device onto a chosen plane at a given moment in time.

In one embodiment, the portable RFID reading terminal can, by reading RFID tags attached to the items, reconcile a count of items stored in a manufacturing, retail, and/or storage facility against an expected count which can be received, e.g., from an external computer. In another embodiment, the portable RFID reading terminal can, by reading RFID tags attached to the items, reconcile an inventory of items stored in a manufacturing, retail, and/or storage facility against an expected inventory list received, e.g., from an external computer. In a further aspect, the portable RFID reading terminal can transmit to the external computer the list or the count of read RFID tags.

In one embodiment, the portable RFID reading terminal can further comprise a two-dimensional imager. The portable RFID reading terminal can be further configured to determine a spatial position of the RF signal coverage shape based on a known position and orientation of the RF antenna relative to the position of the field of view of the two-dimensional imager.

In one embodiment, the portable RFID reading terminal can be further configured to measure a distance to an object using the two-dimensional imager. The portable RFID reading terminal can be further configured to determine and display the projection of the RF signal coverage shape onto the plane defined by the physical structure which in one embodiment can contain a plurality of inventory items.

In one embodiment, the portable RFID reading terminal can further comprise at least one accelerometer. The portable RFID reading terminal can be further configured to determine a change of the spatial position and orientation of the RF signal coverage shape based on the proper acceleration values received from the accelerometer.

In one embodiment, the portable RFID reading terminal can be configured to display a quantity of scanned items, a quantity of items which have not be scanned yet, and/or a total quantity of items to be scanned.

In one embodiment, the portable RFID reading terminal can be configured to display an indicator of a ratio of quantity of scanned items to a total quantity of items to be scanned.

In one embodiment, the portable RFID reading terminal can be configured to display a scan trace overlaid over an image of a physical structure which can contain one or more scanned items and/or one or more items to be scanned. In a further aspect, the image of the physical structure can be acquired by the two-dimensional imager or received from an external computer. In one embodiment, portable RFID reading terminal can be configured to receive a description of the physical structure, and create an image of the physical structure based on the description.

In one embodiment, the portable RFID reading terminal can be configured to display an indicator of an RF signal coverage over a scan trace overlaid over an image of a physical structure.

In one embodiment, the portable RFID reading terminal can be configured to display an indicator of an RF signal coverage over a current position within the scan trace.

In some embodiments, a handheld system uses an optical barcode scanner and a handheld RFID reader in a single device to estimate a scan path of handheld RFID reader when performing retail inventory. This is performed by scanning custom barcodes indicating the location of barcode on fixture and guiding the user to a path to move the handheld RFID reader.

In one embodiment, a system for reading RFID tags may include: a barcode reader that projects a light to read barcodes attached to an object in a predetermined sequential order; and an RFID reader comprising an antenna that reads RFID tags while the barcode reader moves to sequentially read the barcodes in the predetermined sequential order along the object; wherein an RFID scan path of the object is determined based on scanning the barcodes in the predetermined sequential order.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 20a-20c schematically illustrate embodiments of an RFID reading terminal.

The drawings are not necessarily to scale, emphasis instead generally being placed upon illustrating the principles of the invention. In the drawings, like numerals are used to indicate like parts throughout the various views.

DETAILED DESCRIPTION

Figure 1:
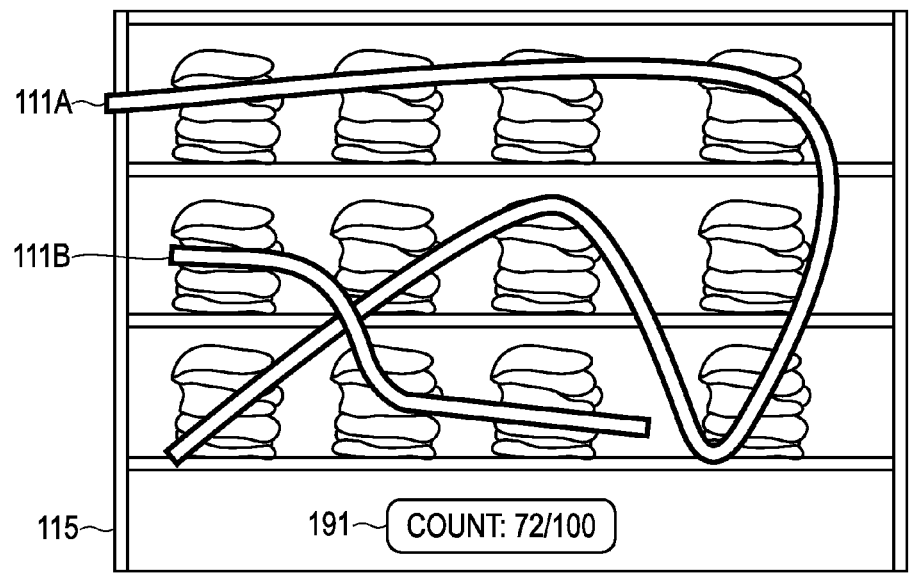
FIG. 1 schematically illustrates a scan trace displayed by an RFID reading terminal.

RFID reading devices usually offer improved efficiency over barcode scanning devices for retail inventory, by being capable of reading multiple RFID tags that are within range of the RF signal transmitted by an RFID reading device. A downside to this multiple-read capability is lack of scanned items localization, due to insufficient correlation between where the RFID reader is located or oriented, and the RFID tags being read. Retail inventory management typically requires more than 90% of the RFID tags present in a department to be successfully acquired during the inventory process. When this high accuracy is not achieved, it is necessary to rescan the entire department, since the locations of any unread RFID tags are unknown.

In one embodiment, there is provided a portable radio-frequency identifier (RFID) reading terminal configured to present a visual indication of defined areas which have been scanned and areas which have not been scanned for RFID tags. Such a capability provides increased operational efficiency of RFID tag reading for retail inventory management. Various embodiments of the RFID reading terminal can be used in a numerous applications, including but not limited to, item tracking in manufacturing, storage, and retail, real-time inventory control systems, etc.

Item tracking and/or inventory control can be implemented by placing an RFID tag on each inventory item. The RFID reading terminal can comprise at least one RFID reading device which can be configured to read and/or modify a memory of an RFID tag containing an encoded message. The RFID reading device can transmit and/or receive radio frequency (RF) signals to and from RFID tags attached to inventory items. Each RFID tag can store the tag identifier in its memory. An RFID tag attached to an inventory item can further store in the tag's memory a product code of the item, an EPC (Electronic Product Code) of the item, and/or at least one alphanumeric string identifying the item.

The RFID reading device can be further configured to output decoded message data corresponding to the encoded message, e.g., decoded message data containing identifiers of the items to which the RFID tags are attached. The RFID reading terminal can be configured to store in its memory and/or transmit to an external computer the item identifiers received from the plurality of RFID tags.

In a further aspect, the RFID reading terminal can be configured to receive an expected count of inventory items or an expected inventory list of items of interest stored within a storage, manufacturing, and/or retail facility. As used herein, "inventory list" shall refer to a collection of item descriptions, each item description comprising at least the item identifier.

In one embodiment, the RFID reading terminal can receive the expected count of inventory items or the expected inventory list over a network from an external computer. In another embodiment, the RFID reading terminal can receive the expected count of inventory items or the expected inventory list via the user interface. In a yet another embodiment, the RFID reading terminal can receive the expected count of inventory items or the expected inventory list by reading an external memory device connected to one of the terminal's I/O ports (e.g., a USB port, or a PCMCIA interface). In a yet another embodiment, the RFID reading terminal can be equipped with a 2D imager and can receive the expected count of inventory items or the expected inventory list via the 2D imager, for example, by scanning a plurality of optical decodable indicia (e.g., a plurality of bar codes), or by acquiring an image of a textual document containing the expected count of inventory items or the expected inventory list and then processing the image using optical character recognition (OCR) methods.

The RFID reading terminal can be further configured to reconcile the inventory of items stored within a storage, manufacturing, and/or retail facility against the expected count of inventory items or the expected inventory list by reading the RFID tags attached to the inventory items.

The RFID reading terminal can read RFID tags from a range of distances and various terminal orientations with respect to an RFID tag being read. To further improve the reliability of scanning operations and the terminal's operator experience, the RFID reading terminal can be configured to emit audible signals (e.g., beeps) to indicate an occurrence of a pre-defined event, thus providing an audible feedback to the operator of the RFID reading terminal. In one embodiment, the RFID reading terminal can be configured to emit an audible signal of a first type every time a unique RFID tag has been successfully read and reconciled against an inventory list. The RFID reading terminal can be further configured to and emit an audible signal of a second type every time a unique RFID tag has been successfully read but failed to reconcile against the inventory list. The RFID reading terminal can be further configured to emit an audible signal of a third type every time a pre-defined timeout has elapsed without reading an RFID tag. However, the audible feedback inherently fails to indicate the location of the RFID tag having been successfully read.

To further improve the readability of scanning operations, the RFID reading terminal can in one embodiment be configured to display on the terminal's display one or more scan traces, thus providing the terminal's operator with a visual feedback with respect to the scanning progress, as schematically shown in FIG. 1.

Figure 2:
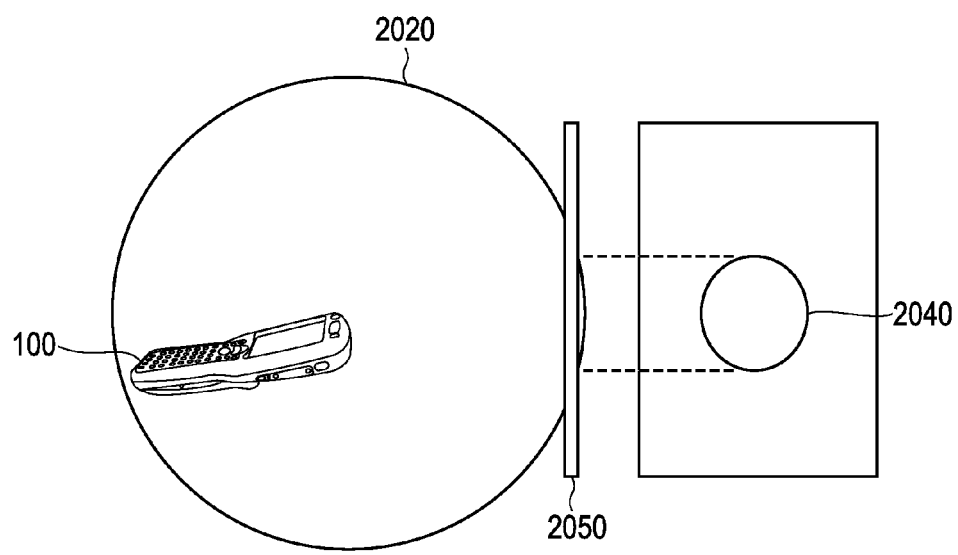
FIG. 2 schematically illustrates an RF signal coverage shape by the RFID reading terminal.

At any moment in time, the RF signal coverage emitted by an RFID reading terminal can be defined by a 3D shape, as schematically shown in FIG. 2. The form and size of the 3D shape defining the RF signal coverage can depend, among other factors, on the RFID transmit power level and the number and configuration of the RF antennas employed by the RFID reading device. In one embodiment, the 3D signal coverage shape can be provided by a sphere 2020. In another embodiment, the 3D signal coverage shape can be provided by an ellipsoid. In a yet another embodiment, the 3D signal coverage shape can be provided by a cone.

At any given moment in time, a target scan area by an RFID reading terminal can be visualized as a projection 2040 of the 3D RF signal coverage shape 2020 onto an arbitrarily chosen plane 2050, including an imaginary plane. For a moving RFID reading terminal, a visual scan trace can be provided by a line defined by a multitude of time varying points, each point being a projection 2040 of the 3D RF signal coverage shape 2020 onto the arbitrarily chosen plane 2050 at a given moment in time.

In a further aspect, the imaginary plane onto which the visual scan trace is projected can be chosen to intersect a physical structure (e.g., a shelf) containing the inventory items, and thus the scan trace can be overlaid over an image of the physical structure as schematically shown in FIG. 1.

Figure 3:
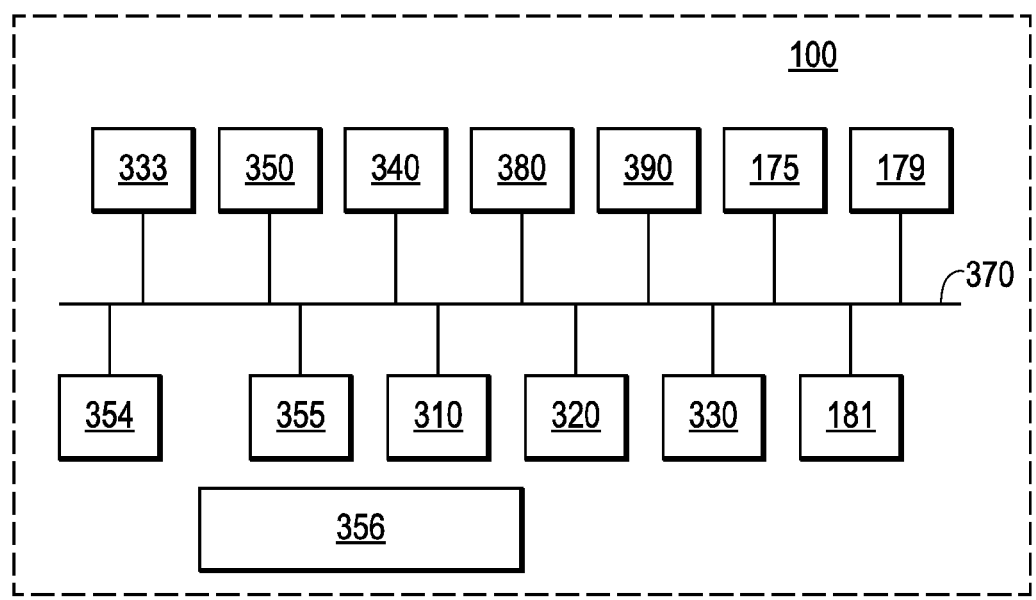
FIG. 3 schematically illustrates a component-level diagram of one embodiment of the RFID reading terminal.

Component-level diagram of one embodiment of the RFID reading terminal is now being described with references to FIG. 3. The RFID reading terminal 100 can comprise at least one microprocessor 310 and a memory 320, both coupled to the system bus 370. The microprocessor 310 can be provided by a general purpose microprocessor or by a specialized microprocessor (e.g., an ASIC). In one embodiment, RFID reading terminal 100 can comprise a single microprocessor which can be referred to as a central processing unit (CPU). In another embodiment, RFID reading terminal 100 can comprise two or more microprocessors, for example, a CPU providing some or most of the RFID reading terminal functionality and a specialized microprocessor performing some specific functionality. A skilled artisan would appreciate the fact that other schemes of processing tasks distribution among two or more microprocessors are within the scope of this disclosure.

RFID reading terminal 100 can further comprise a communication interface 340 communicatively coupled to the system bus 370. In one embodiment, the communication interface can be provided by a wireless communication interface. The wireless communication interface can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1xEV-DO protocol family.

RFID reading terminal 100 can further comprise a battery 356. In one embodiment, the battery 356 can be provided by a replaceable rechargeable battery pack. The RFID reading terminal 100 can further comprise a GPS receiver 380. The RFID reading terminal 100 can further comprise at least one connector 390 configured to receive a subscriber identity module (SIM) card.

The RFID reading terminal 100 can further comprise an imaging device 330, provided, for example, by a two-dimensional imager.

The RFID reading terminal 100 can further comprise an RFID reading device 333. In one embodiment, the RFID reading device 333 can be configured to read a memory of an RFID tag containing an encoded message and to output raw message data containing the encoded message. In another embodiment, the RFID reading device 333 can be configured to read a memory of an RFID tag containing an encoded message and to output decoded message data corresponding to the encoded message. As used herein, "message" is intended to denote a bit sequence or a character string comprising alphanumeric and/or non-alphanumeric characters. An encoded message can be used to convey information, such as identification of the source and the model of an item, for example, in an EPC code.

In one embodiment, the RFID reading terminal 100 can further comprise a graphical user interface including a display adapter 175 and a keyboard 179. In one embodiment, the RFID reading terminal 100 can further comprise an audio output device, e.g., a speaker 181.

It is not necessary that a device's primary function involve reading RFID tags in order to be considered an RFID reading terminal; for example, a cellular telephone, a smart phone, a PDA, or other portable computing device that is capable of reading RFID tags can be referred to as an RFID reading terminal for purposes of this disclosure.

Figure 4:
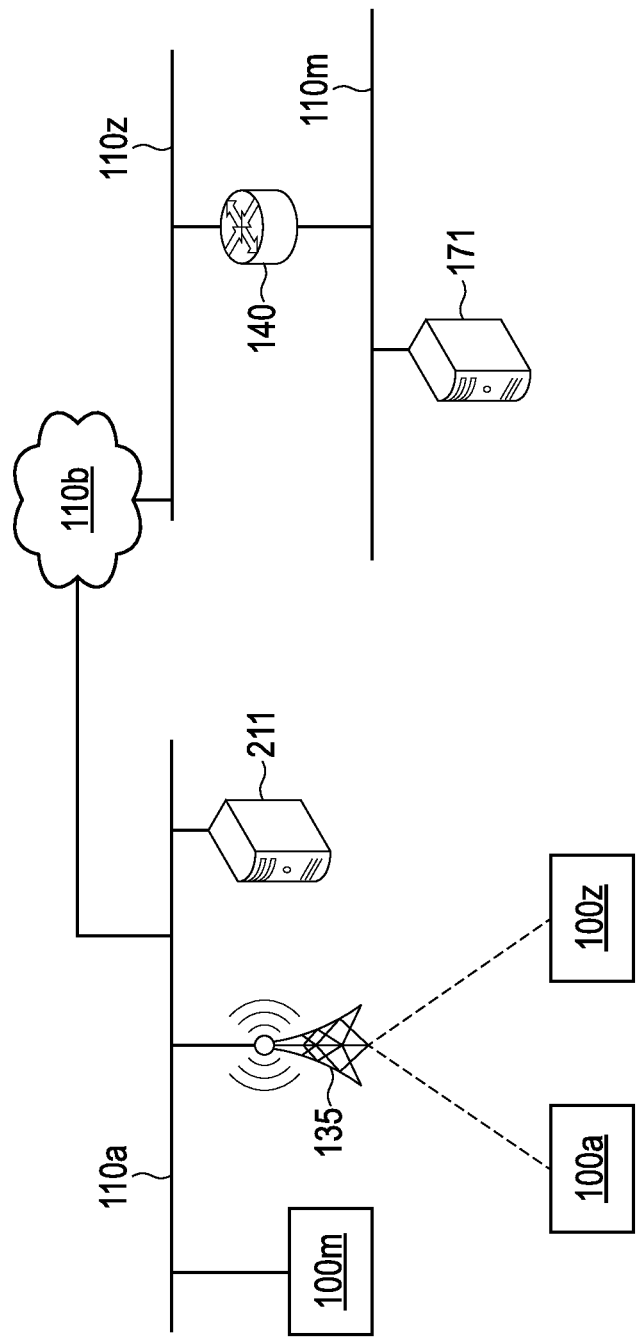
FIG. 4 schematically illustrates a network diagram of one embodiment of a data collection system employing RFID reading terminals.

In a further aspect, the RFID reading terminal can be incorporated in a data collection system. One embodiment of the data collection system, schematically shown in FIG. 4, can include a plurality of RFID reading terminals 100a-100z in communication with a plurality of interconnected networks 110a-110z.

An RFID reading terminal 100a-100z can establish a communication session with an external computer 171. In one embodiment, network frames can be exchanged by the RFID reading terminal 100 and the external computer 171 via one or more routers 140, access points 135, and other infrastructure elements. In another embodiment, the external computer 171 can be reachable by the RFID reading terminal 100 via a local area network (LAN). In a yet another embodiment, the external computer 171 can be reachable by the RFID reading terminal 100 via a wide area network (WAN). In a yet another embodiment, the external computer 171 can be reachable by the RFID reading terminal 100 directly (e.g., via a wired or wireless interface). A skilled artisan would appreciate the fact that other methods of providing interconnectivity between the RFID reading terminal 100 and the external computer 171 relying upon LANs, WANs, virtual private networks (VPNs), and/or other types of network are within the scope of this disclosure.

A "computer" herein shall refer to a programmable device for data processing and control, including a central processing unit (CPU), a memory, and at least one communication interface. For example, in one embodiment, a computer can be provided by a server running a single instance of a multi-tasking operating system. In another embodiment, a computer can be provided by a virtual server, i.e., an isolated instance of a guest operating system running within a host operating system. A "network" herein shall refer to a set of hardware and software components implementing a plurality of communication channels between two or more computers. A network can be provided, e.g., by a local area network (LAN), or a wide area network (WAN). While different networks can be designated herein, it is recognized that a single network as seen from the application layer interface to the network layer of the OSI model can comprise a plurality of lower layer networks, i.e., what can be regarded as a single Internet Protocol (IP) network, can include a plurality of different physical networks.

The communications between the RFID reading terminal 100 and the external computer 171 can comprise a series of requests and responses transmitted over one or more TCP connections. A skilled artisan would appreciate the fact that using various transport and application level protocols is within the scope and the spirit of the invention.

At least one of the messages transmitted by the RFID reading terminal 100 can include decoded message data corresponding to an RFID label attached to an inventory item. For example, an RFID reading terminal can transmit a request to the external computer to retrieve product information corresponding to a product identifier encoded by an RFID tag attached to a retail item, or to transmit an item tacking record for an item identified by an RFID tag attached to the item.

As noted herein supra, the RFID reading terminal 100 can be configured to receive from the external computer 171 an inventory list containing item identifiers, or count, of items stored within a storage, manufacturing, and/or retail facility. The inventory list or count can further contain storage location information of specific items. The RFID reading terminal 100 can be further configured to reconcile an inventory of items stored in a manufacturing, retail and/or storage facility against the inventory list or count, by reading RFID tags attached to the items. The RFID reading terminal 100 can be configured to transmit the reconciled list or count to the external computer 171.

The RFID reading terminal 100 can be further configured to display a scan trace on the terminal's display, thus providing to the operator a visual feedback with respect to the scanning progress. In one embodiment, one or more scan traces 111a, 111b can be overlaid over an image of physical structure 115 containing the inventory items as schematically shown in FIG. 1. In a further aspect, for a moving RFID reading terminal, a visual scan trace can be provided by a line defined by a multitude of time varying points, each point being a projection of the 3D RF signal coverage shape onto a plane defined by the physical structure 115 containing the inventory items at a given moment in time.

Figure 5A:
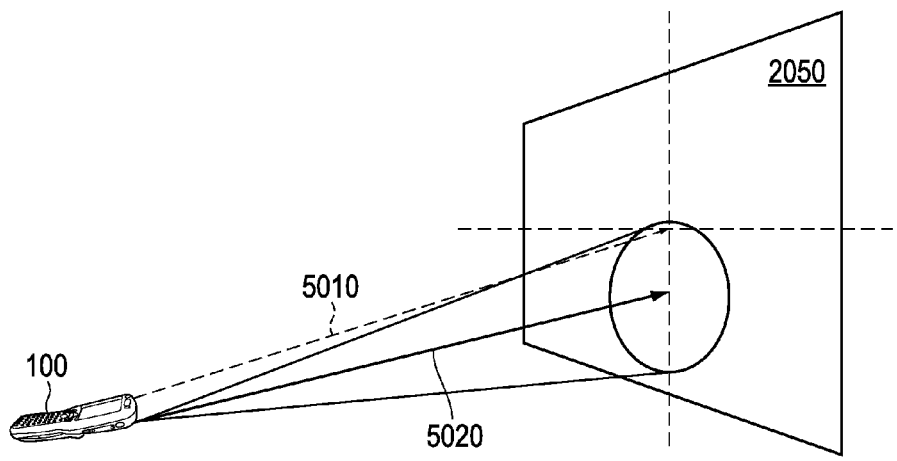
FIGS. 5a-5b schematically illustrate determining a spatial position of the RF signal coverage shape based on the known position and orientation of an RF antenna relatively to the position of the field of view of a two-dimensional imager.
Figure 5B:
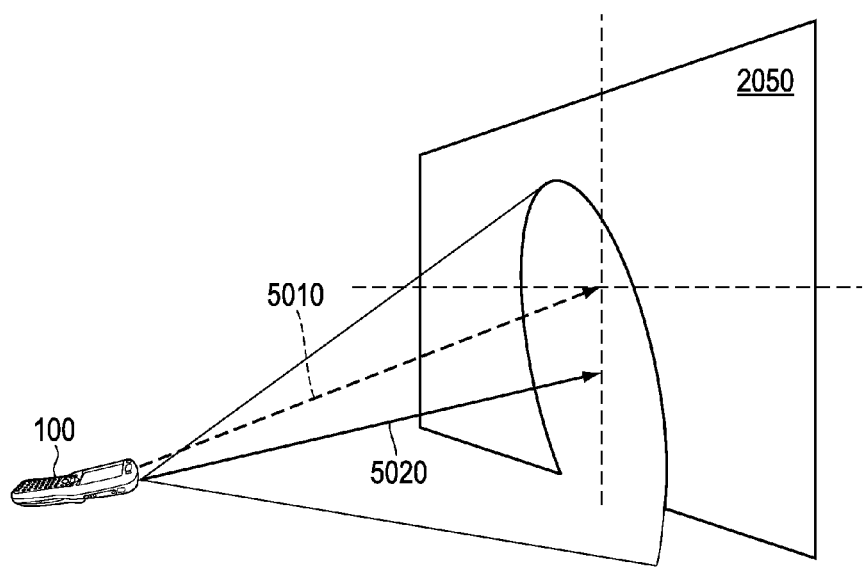

A noted herein supra, in one embodiment, the RFID reading terminal can comprise a two-dimensional imager. The RFID reading terminal can be configured to determine a spatial position of the RF signal coverage shape based on the known position and orientation of the RF antenna relatively to the position of the field of view (FOV) of the two-dimensional imager, as schematically shown in FIGS. 5a-5b.

The plane 2050 can represent an arbitrary chosen plane, e.g., a plane intersecting a physical structure hosting one or more inventory items. The RF antenna can be oriented relatively to the view finder in such a way that the central axis 5010 of the field of view of the imager would be parallel to the central axis 5020 of the RF signal coverage shape by the antenna. Reducing the distance between the RFID reading terminal and the plane 2050 and/or increasing the RF transmit power level results in a larger projection of the RF signal coverage area onto the plane 5020, as schematically shown in FIGS. 5a-5b. In the example of FIG. 5b, the lesser distance and/or the greater transmit power level results in a larger projection RF signal coverage area onto the plane 5020. The projection of the RF signal coverage shape onto the plane 2050 can be entirely within the FOV of the two-dimensional imager, as schematically shown in FIG. 5a, or can be partially outside of the FOV of the two-dimensional imager, as schematically shown in FIG. 5b.

In a further aspect, the RFID reading terminal can be configured to measure the distance to an object using a two-dimensional imager. Based on the known shape of the signal coverage and the distance and orientation of the RF antenna to a physical structure 115 containing the inventory items, the RFID reading terminal can determine and display the projection of the 3D RF signal coverage shape onto the plane defined by the physical structure 115.

In another embodiment, the RFID reading terminal can comprise one or more accelerometers and can be configured to determine the change of the spatial position and orientation of the RF signal coverage shape based on the proper acceleration values received from the accelerometers. In one illustrative embodiment, the RFID reading terminal can comprise three or more accelerometers.

Figure 6:
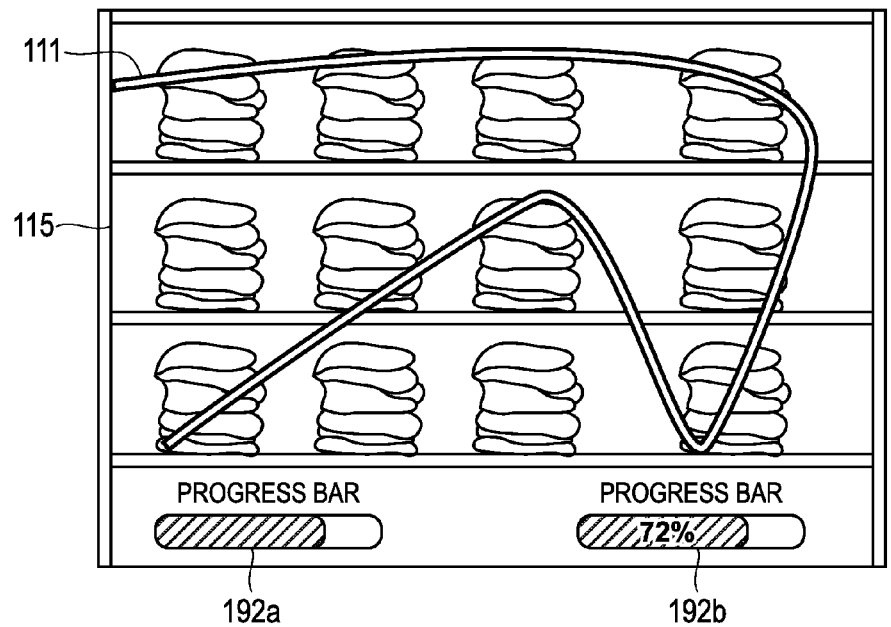
FIGS. 6-19 schematically illustrate various methods of displaying scan traces and selected inventory quantities by the RFID reading terminal.

In one embodiment, the RFID reading terminal 100 can be further configured to display a quantity of scanned items, a quantity of items which have not been scanned yet, and/or a total quantity of items to be scanned, the latter quantity determined based on an inventory count or list of items describing a storage, manufacturing, and/or retail facility. A progress indicator 191 of FIG. 1 shows the number of items scanned and the total number of items expected to be scanned. In another embodiment, the RFID reading terminal 100 can be further configured to display a both an absolute progress bar 192a, and/or a relative progress bar 192b indicating a quantity of scanned items and a total quantity of items expected to be scanned, as shown in FIG. 6.

Figure 7:
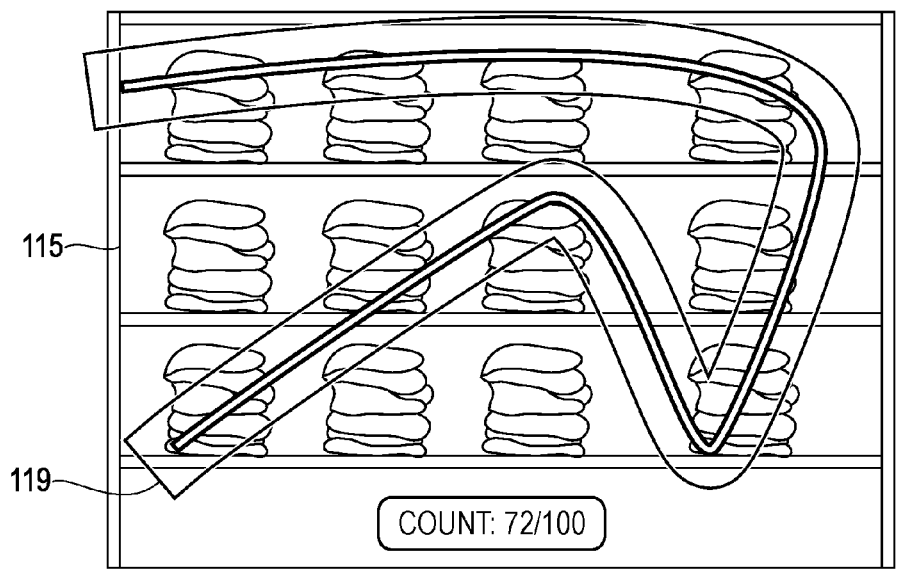
Figure 8:
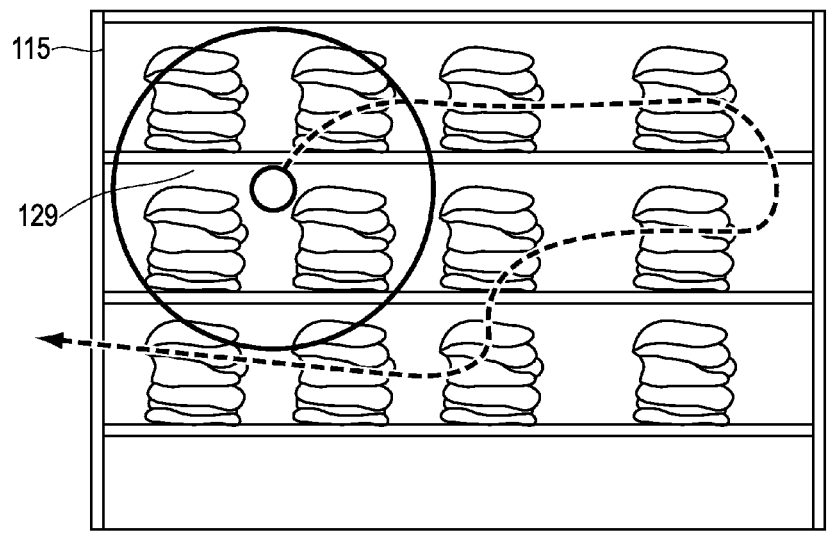

In one embodiment, the RFID reading terminal 100 can be further configured to display an indicator 119 of the RF signal coverage over a scan trace, as schematically shown in FIG. 7. The indicator of the RF signal coverage can be determined as a line being a projection of the 3D RF signal coverage shape onto a plane defined by the physical structure 115 containing the inventory items. In another embodiment, the RFID reading terminal 100 can be further configured to display an indicator 129 of the RF signal coverage over a current position aimed at by the RFID reading terminal, as schematically shown in FIG. 8.

In one embodiment, the RFID reading terminal 100 can be further configured to display a scan trace overlaid over an image of a physical structure (e.g., a shelf) containing one or more scanned items and one or more items to be scanned. In one embodiment, the image of the physical structure containing the inventory items can be received by the RFID reading terminal 100 over the network from an external computer. In another embodiment, the RFID reading terminal 100 can comprise a two-dimensional imager, and the image of the physical structure containing the inventory items can be acquired by the two-dimensional imager. In another embodiment, the image of the physical structure is drawn, with appropriate detail, on the RFID reading terminal display, based on a description of the physical structure received by the terminal 100 via the user interface, from an external peripheral device or from an external computer.

Figure 9:
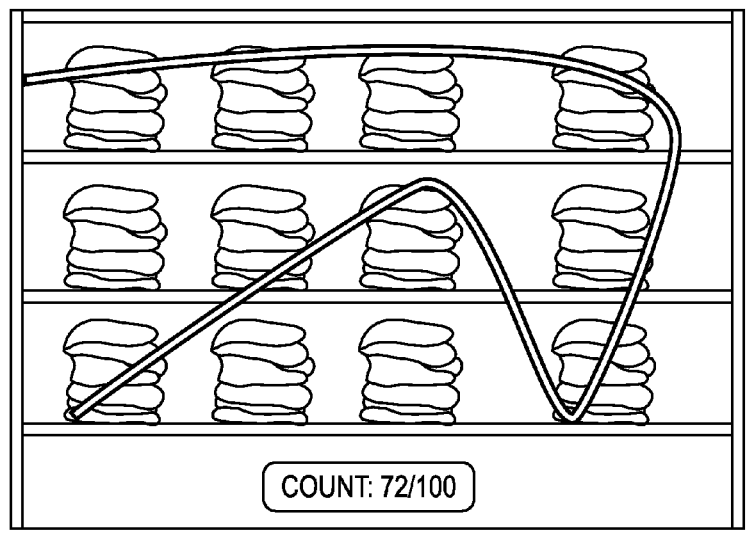
Figure 10:
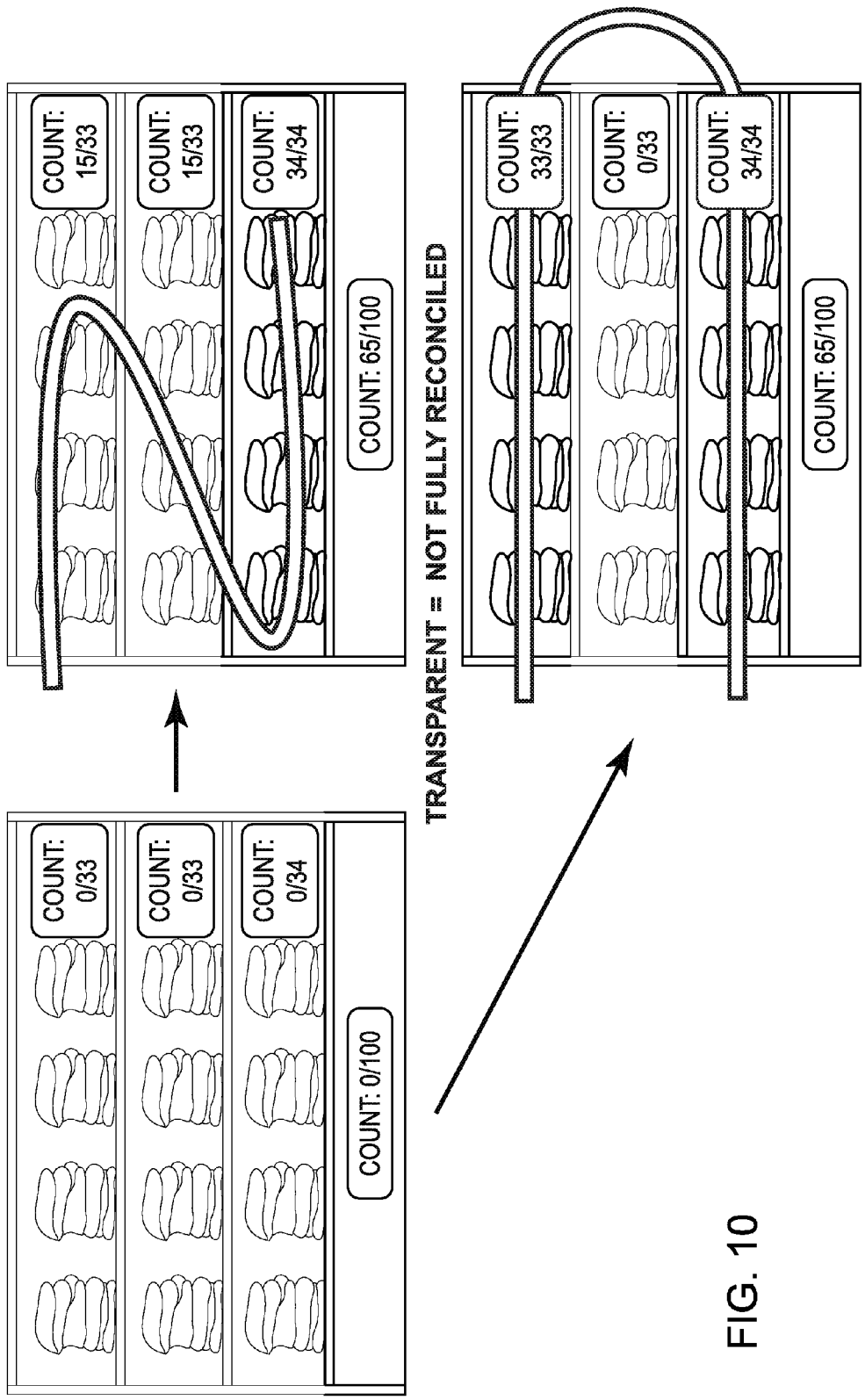
Figure 11:
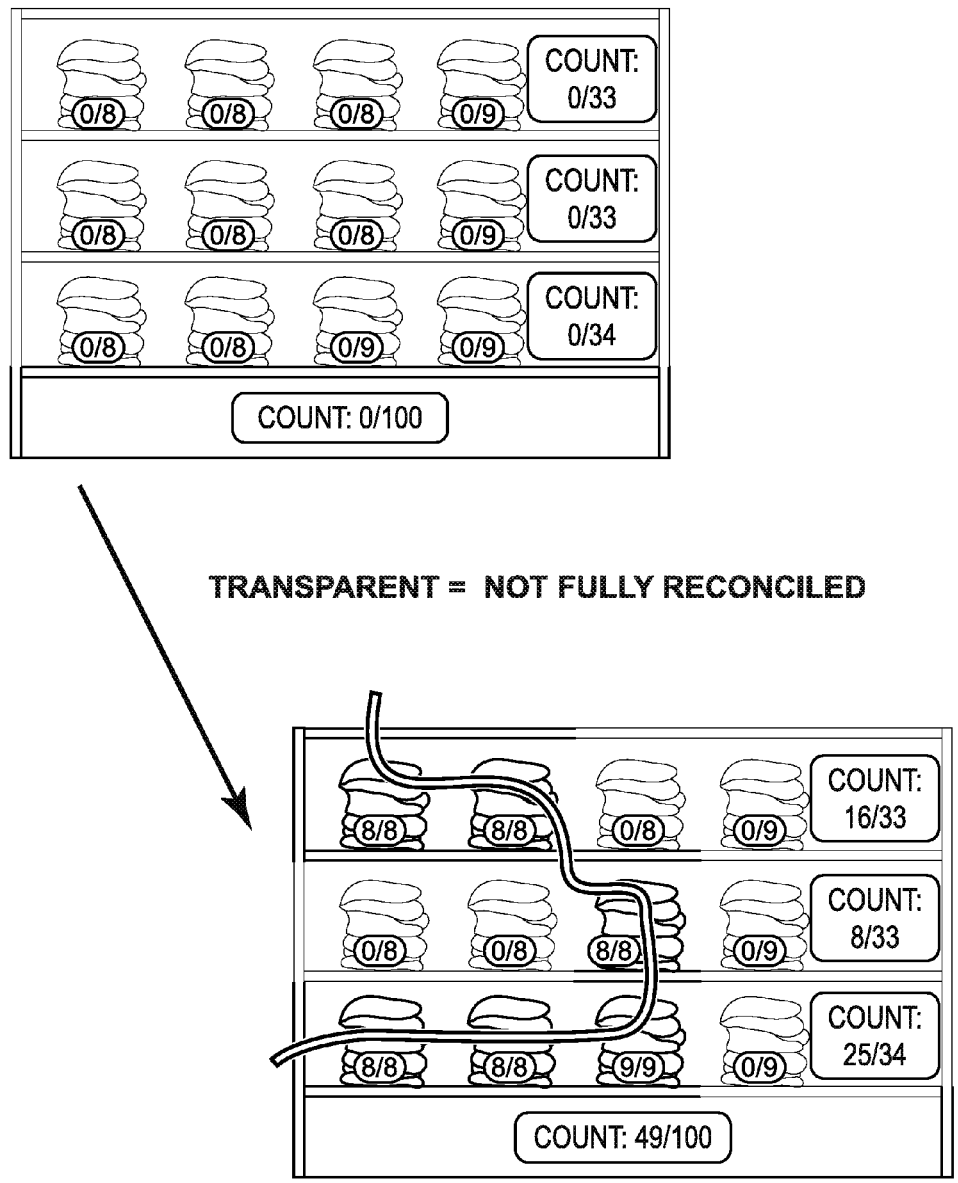
Figure 12:
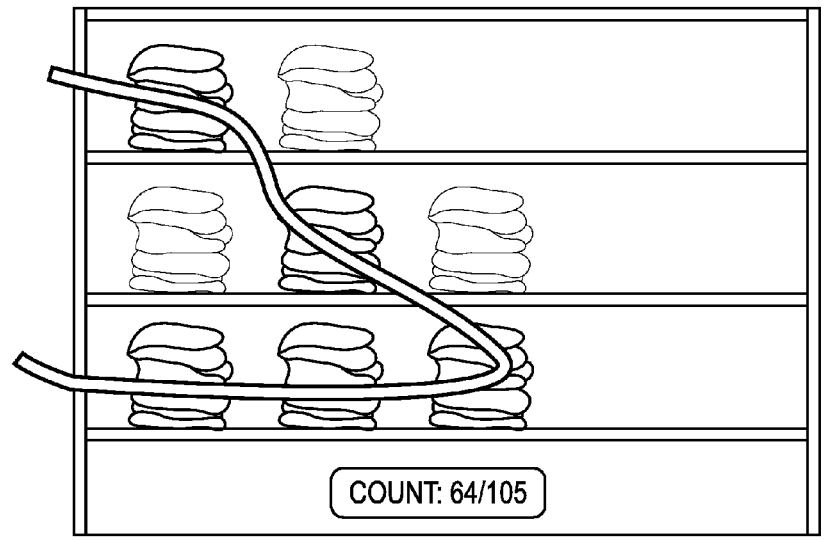
Figure 13:
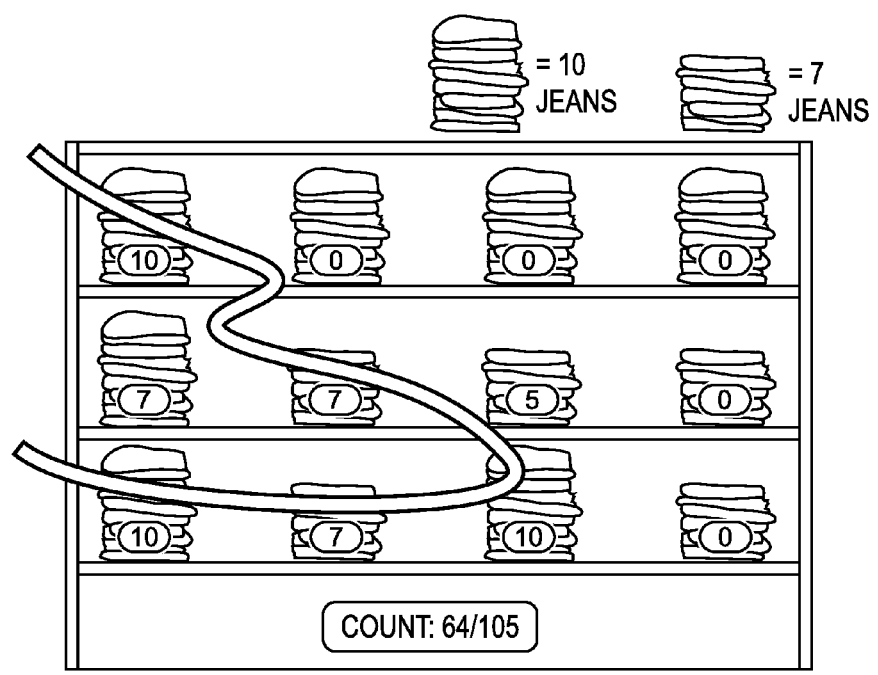
Figure 14:
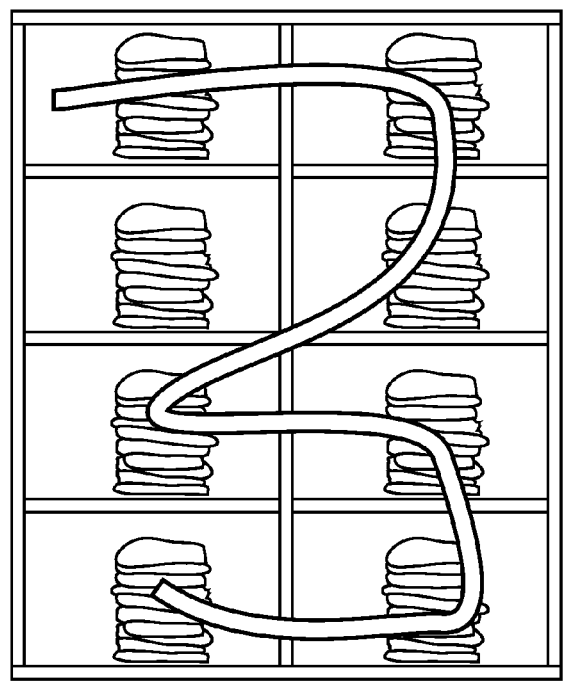
Figure 15:
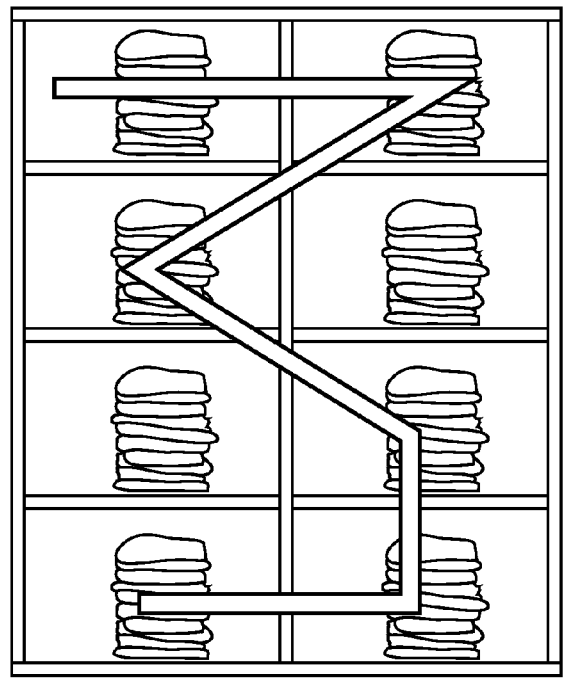
Figure 16:
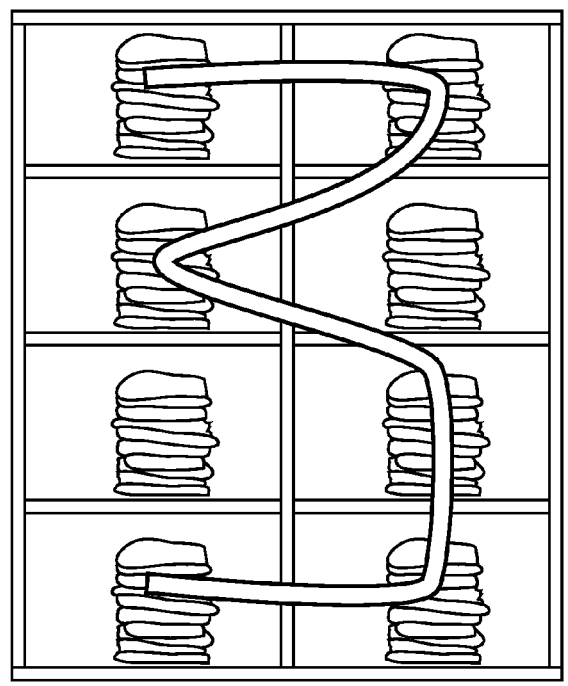
Figure 17:
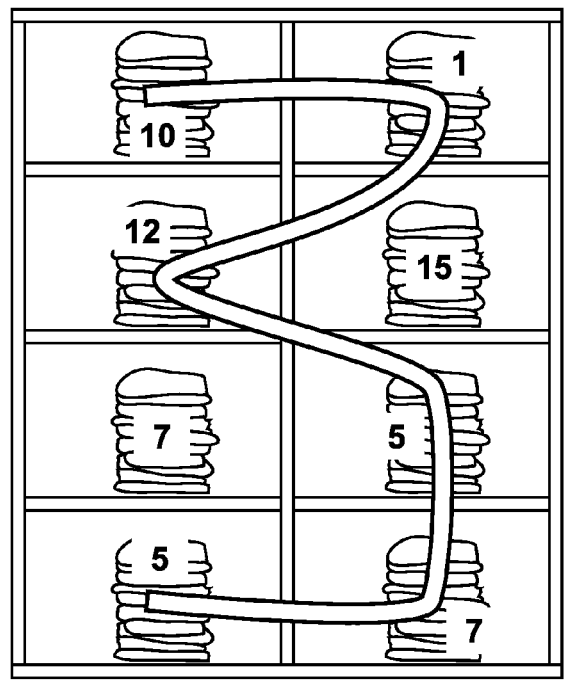
Figure 18:
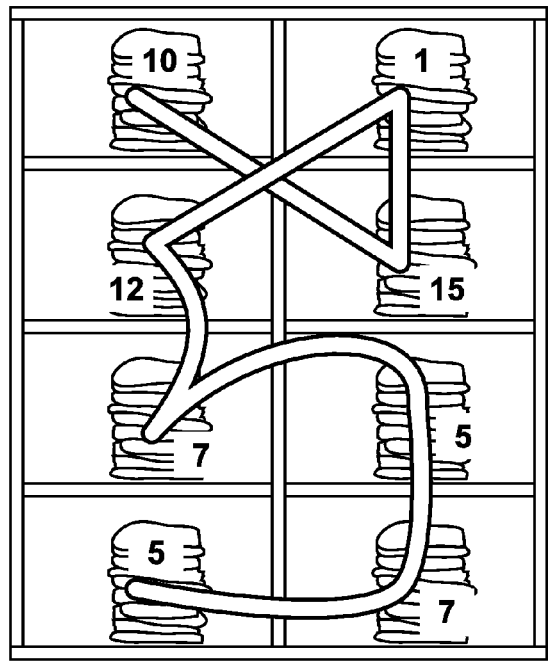
Figure 19:
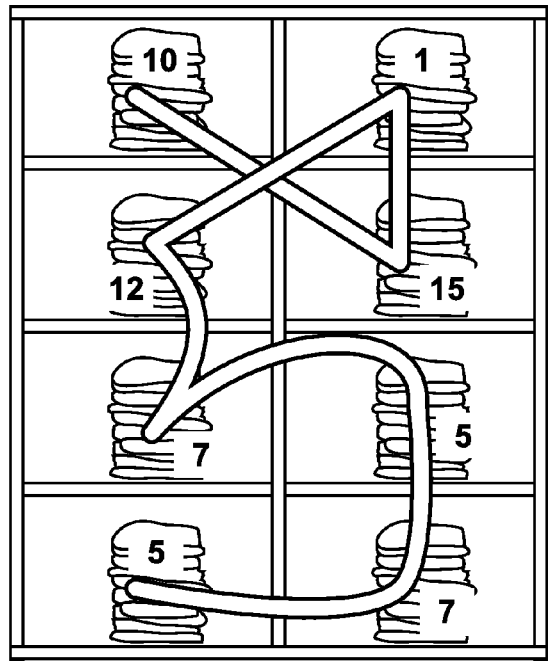

In one embodiment, the items which have already been scanned and which have not yet been scanned can be displayed in two different colors, as schematically shown in FIG. 9. In another embodiment, the items which have already been scanned and which have not yet been scanned can be displayed using two different transparency patterns, as schematically shown in FIGS. 10-11. In one embodiment, a part of the physical structure (e.g., shelves or sections of shelves) containing inventory items having not been fully reconciled against the inventory list can be shown using a transparent pattern. In another embodiment, schematically shown in FIG. 12, multiple colors and/or transparency pattern can be used to display parts of physical structure containing the inventory items which have been fully reconciled, partially reconciled, or containing no items having been reconciled. In a yet another embodiment, schematically shown in FIG. 13, quantities of reconciled items can be displayed associated with groups of inventory items. Various embodiments displaying scan traces and showing the quantities of inventory items by the RFID reading terminal 100 are shown in FIGS. 14-19.

In one embodiment, schematically shown in FIG. 20, the RFID reading terminal 100 can be further configured to receive from an external computer and to display a floor plan of the manufacturing, retail and/or storage facility. The RFID reading terminal can be further configured to display its position on the floor plan. The RFID reading terminal can be further configured to display in two or more different colors one or more areas containing the items which have already been scanned and one or more areas containing the items which have not yet been scanned .

In a further aspect, RFID reading device 333 can be compliant with *EPC™ Class-1 Generation-2 UHF RFID Protocol for Communications at* 860 *MHz-*960 *MHz* by EPCglobal, commonly known as the "Gen 2" standard, which defines physical and logical requirements for a passive-backscatter, interrogator-talks-first (ITF) RFID system operating in the 860 MHz-960 MHz frequency range.

In one embodiment, RFID reading terminal 100 can transmit information to a passive RFID tag by modulating an RF signal in the 860-960 MHz frequency range. An RFID tag can receive both information and operating energy from the RF signal transmitted by the RFID reading terminal 100. RFID reading terminal 100 can receive information from the RFID tag by transmitting a continuous-wave (CW) RF signal to the RFID tag. "Continuous wave" can refer to any waveform transmitted by an RFID reading device and suitable to power a passive RFID tag, e.g., a sinusoid at a given frequency. The RFID tag can respond by modulating the reflection coefficient of its antenna, thus backscattering an information signal to the RFID reading terminal 100. In one embodiment, the RFID tag can modulate the reflection coefficient of its antenna only responsive to receiving an RFID signal from RFID reading terminal 100.

In a further aspect, RFID reading terminal 100 can be configured to send information to one or more RFID tags by modulating an RF carrier using double-sideband amplitude shift keying (DSB-ASK), single-sideband amplitude shift keying (DSB-ASK), or phase-reversal amplitude shift-keying (PR-ASK) using a pulse-interval encoding (PIE) format. RFID tags can receive their operating energy from the same modulated RF carrier.

The RFID reading terminal 100 can be configured to receive information from an RFID tag by transmitting an unmodulated RF carrier and listening for a backscatter reply. RFID tags can transmit information by backscatter-modulating the amplitude and/or phase of the RFID carrier. RFID tags can encode the backscattered data using, e.g., FM0 baseband or Miller modulation of a subcarrier at the data rate. The encoding method to be employed by an RFID tag can be selected by the RFID reading terminal 100.

In another aspect, RFID reading terminal can establish one or more sessions with one or more RFID tags. An RFID tag can support at least one session-dependent flag for every session. The session-dependent flag can have two states. An RFID tag can invert a session-dependent flag responsive to receiving a command from RFID reading terminal 100. Tag resources other than session-dependent flags can be shared among sessions. In another aspect, an RFID tag can support a selected status flag indicating that the tag was selected by the RFID reading terminal 100.

Responsive to receiving an interrogation signal transmitted by the RFID reading terminal 100, an RFID tag can transmit a response signal back to RFID reading terminal 100. The response signal can contain useful data, e.g., an Electronic Product Code (EPC) identifier, or a tag identifier (TID). The response signal can include a representation of a binary string, at least part of which is equal to at least part one of the specified one or more target item identifiers.

In one embodiment, RFID reading terminal can implement *EPC™ Class-*1 *Generation-*2 *UHF RFID Protocol for Communications at* 860 *MHz-*960 *MHz* by EPCglobal. The RFID reading terminal 100 can interrogate RFID tags using the commands described herein infra.

Select command can be used by the RFID reading terminal 100 to select a particular RFID tag population for the subsequent inventory round. Select command can be applied successively to select a particular tag population based on user-specified criteria. Select command can include the following parameters:

Target parameter indicates whether Select command modifies a tag's SL flag or Inventoried flag, and in the latter case it further specifies one of four available sessions (S0, . . . , S3);

Action parameter indicates whether matching tags assert or deassert SL flag, or set their Inventoried flag to A or B state; tags conforming to the contents of MemBank, Pointer, Length, and Mask parameters are considered to be matching;

Mask parameter contains a bit string that a tag should compare to a memory location specified by MemBank, Pointer, and Length parameters;

MemBank parameter specifies the memory bank to which Mask parameter refers (EPC, TID, or User);

Pointer parameter specifies a memory start location for Mask;

Length parameter specifies the number of bits of memory for Mask; if Length is equal to zero, all tags are considered matching.

Inventory command set can be used by the RFID reading terminal 100 to single out one or more individual tags from a group. A tag can maintain up to four simultaneous sessions and a binary Inventoried flag for each session. Inventory command set includes the following commands:

Query command can be used to initiate and specify an inventory round; it contains a slot counter value (Q=0 to 15) determining the number of slots in the round; the command also includes Sel parameter specifying which tags should respond to the Query.

QueryAdjust command can be used to adjust the value of the tag's slot counter Q without changing any other parameters;

QueryRep command can be used to repeat the last Query command;

Ack command can be used to acknowledge a tag's response;

NAK command can be used to force a tag to change its state to Arbitrate.

An RFID tag can implement a state machine. Once energized, a tag can change its current state to Ready. A selected tag can, responsive to receiving Query command, select a random integer from the range of [0; $2^{Q-1}$]. If the value of zero is selected, the tag can transition to Reply state, backscattering a 16-bit random number. If a non-zero value is selected, the tag can load the selected random integer into its slot counter and change its state to Arbitrate.

Responsive to receiving the tag transmission, RFID reading terminal can acknowledge it with Ack command containing the same random number. Responsive to receiving Ack command, the tag can change its state to Acknowledged and backscatter its protocol control (PC) bits, EPC and cyclic redundancy check (CRC) value. Unacknowledged tag can select a new random integer from the range of [0; $2^{Q-1}$], load the value into its slot counter, and change its state to Arbitrate. Responsive to receiving QueryAdjust command, a tag in the Arbitrate state should decrement the value of its slot counter and backscatter its protocol control (PC) bits, EPC and CRC value if its slot counter is equal to zero.

Responsive to receiving the tag's transmission of its PC, EPC and 16-bit CRC value, RFID reading terminal can send a QueryAdjust command causing the tag to invert its Inventoried flag and to transition to Ready state.

Access command set can be used by the RFID reading terminal 100 for communicating with (reading from and writing to) a tag. An individual tag must be uniquely identified prior to access. Access command set includes the following commands: ReqRn command can be used by the RFID reading terminal 100 to request a handle from a tag; the handle can be used in the subsequent Access command set commands. Responsive to receiving Req_RN commands, a tag returns a 16-bit random integer (handle) and transitions from Acknowledged to Open or Secured state.

Read command can be used by the RFID reading terminal 100 to read tag's Reserved, EPC, TID and User memory;

Write command can be used by the RFID reading terminal 100 to write to tag's Reserved, EPC, TID and User memory;

Kill command can be used by the RFID reading terminal 100 to permanently disable a tag;

Lock command can be used by the RFID reading terminal 100 to lock passwords preventing subsequent read or write operations; lock individual memory banks preventing subsequent write operations; permanently lock the lock status of passwords or memory banks;

Access command can be used by the RFID reading terminal 100 to cause a tag having a non-zero access password to transition from Open to Secured state.

A skilled artisan would appreciate the fact that other methods of interrogating RFID tags by the RFID reading terminal 100 are within the scope of this disclosure.

One embodiment of the RFID reading terminal 100 is schematically shown in FIGS. 21a (front panel view), 21b (side panel view), and 21c (bottom panel view). The RFID reading terminal 100 can comprise a housing 52 within which other components of the RFID reading terminal 100 can be disposed. An LCD screen display with a touch screen sensor 554 can be disposed on the front panel 556. Also disposed on the front panel 556 can be a decode LED 558, a scan LED 559, and a keyboard 64 including a scan key 568 and navigation keys 72. An imaging window 74 can be disposed on the top panel of housing 52. Disposed on the side panel (best viewed in FIG. 21b) can be an infra-red communication port 76, an access door to a secure digital (SD) memory interface 78, an audio jack 80, and a hand strap 82. Disposed on the bottom panel (best viewed in FIG. 22c) can be a multi-pin mechanical connector 84 and a hand strap clip 86. RFID reading device (not shown in FIGS. 21a-21c) can be disposed within the housing 52.

Point-Based Scan Path Determination

Other embodiments of the present application use a handheld RFID reader with integrated barcode scanner (either laser or imager barcode scanner), and a graphical display. No additional hardware modifications may be necessary. A software application executes on the RFID handheld device processor, to provide a user interface and control the barcode scanner.

To use this system, each retail fixture requires mounting of one or more custom decodable indicia (e.g., barcode) labels 2104 on the fixture 2101. It should be noted that any decodable indicia can be employed. However, for ease of explanation and illustration, the below embodiments are described using barcodes. It should be understood that decodable indicia other than barcodes could be used (e.g., RFID tags, etc.) as long as the decodable indicia There may be at least two types of custom barcode labels: an initial point barcode label 2102 containing data to describe the physical characteristics of the fixture 2101, and multiple custom location barcode labels 2104 indicating locations or reference points on the fixture 2101.

Additionally, it is noted that the output (e.g., laser) of the barcode scanner travels substantially in the same direction as the radiation pattern outputted by the RFID reader of the handheld device. In this regard, when the handheld device is pointed at the barcode label 2104, the handheld device also reads RFID tags located in an area proximate to the barcode label 2104. This allows the user to be guided along a path using the barcode labels 2104 in a particular order to force the handheld device to scan in a certain scan path 2106.

Figure 21:
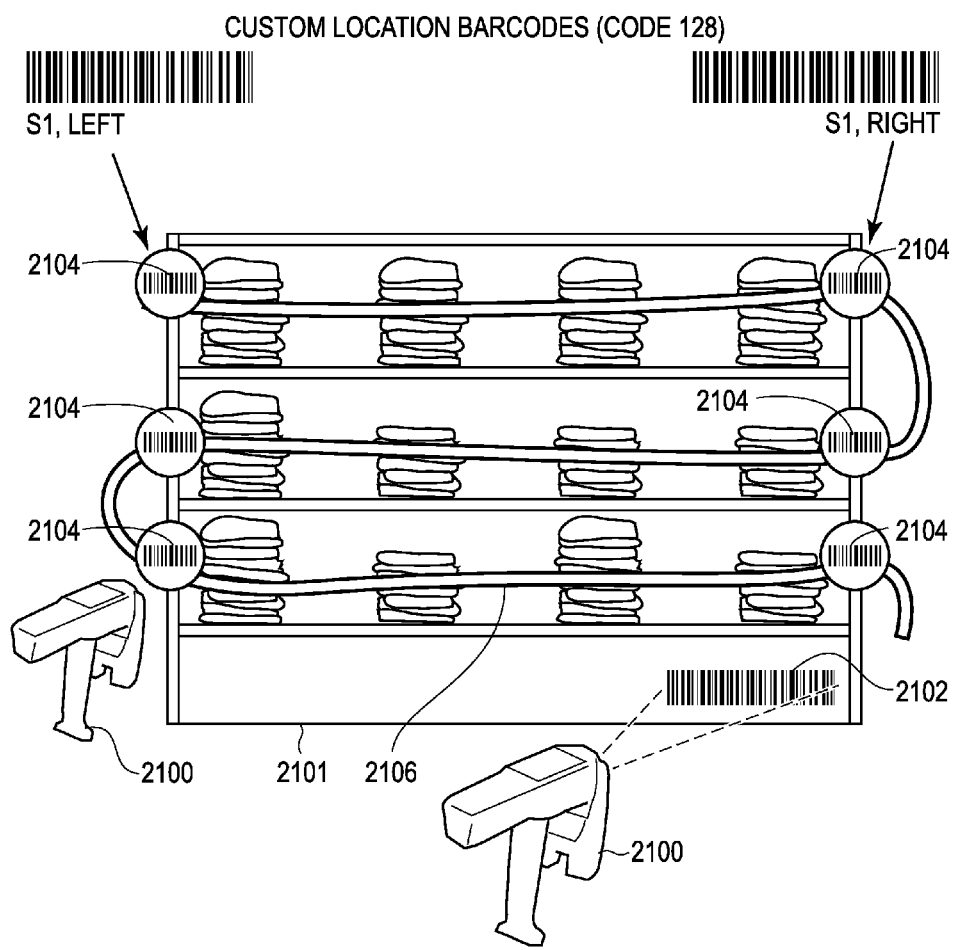
FIG. 21 illustrates a scan trace displayed by an RFID reading terminal using a point-based scan path determination in accordance with an embodiment.

This is exemplified in FIG. 21. As a user moves the handheld RFID reader 2100 while inventorying the fixture 2101 (e.g., the user points the radiation pattern of the handheld RFID reader 2100 toward a first point of the fixture 2101), the user interface (not shown) prompts the user to barcode scan the custom location barcode labels 2104 in a particular order. As each such location barcode label is scanned in the defined order, the software application on the handheld device records the data and time of the barcode label 2104 at which the barcode label 2104 was scanned.

As mentioned above, the barcode labels 2104 are scanned in a particular order. For example, in FIG. 22A, the barcodes are scanned by the RFID reader first (after the reader is moved to S1,L location) from S1,L to S1,R and then from S1,R to S2, R and then from S2,R to S2,L and then from S2,L to S3,L and finally from S3,L to S3,R. This is illustrated by scan path 2106. User feedback may be received indicating a successful barcode scan and the user may wait to receive feedback of successful scan before continuing RFID tag inventory (e.g., before scanning each successive barcode). The scan path 2106 assumes the handheld RFID reader is being conveyed in a substantially straight line therebetween, but this is not required (in one embodiment). Nonetheless, the scan path 2106 allows the RFID reader to scan directly over the correct path for minimizing read errors or missing RFID tags of items intended for inventorying.

Figures 22A, 22B:
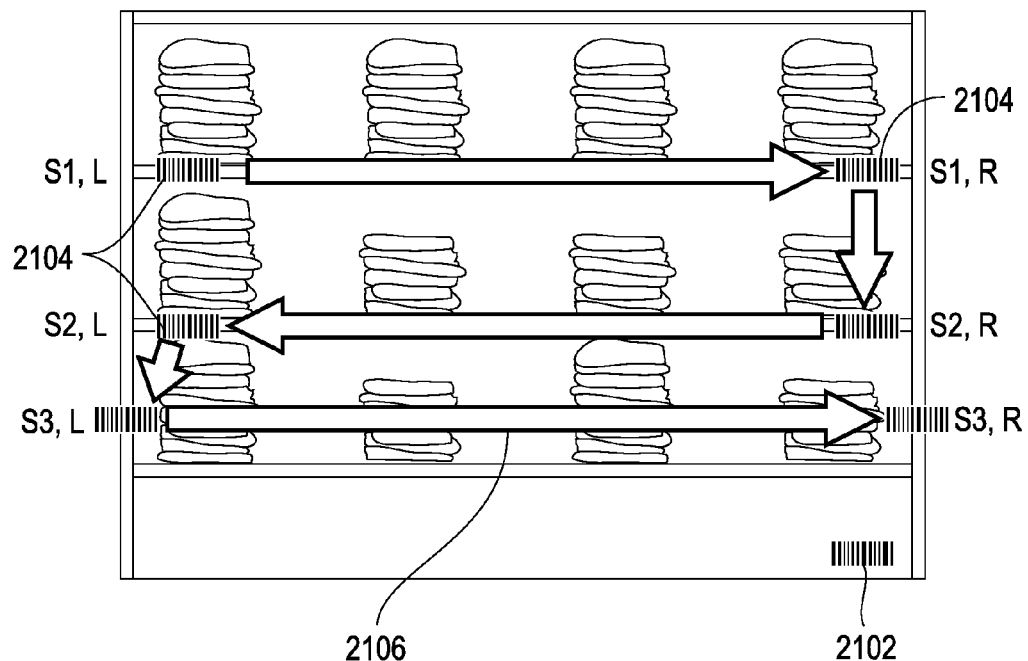
FIG. 22A illustrates a scan trace displayed by an RFID reading terminal using a point-based scan path determination in accordance with an embodiment.
FIG. 22B illustrates a scan path point table used in conjunction with FIG. 22A in accordance with an embodiment.

As mentioned above, the data and time of the barcode label 2104 at which the barcode label 2104 was scanned is recorded by the handheld device and this data pair is entered into a table, with each row indicating a discrete point on the continuous scan path followed by the handheld RFID reader as the retail fixture is inventoried. An example of such table is illustrated in FIG. 22B. As shown, there is a timestamp for each respective barcode label (i.e., 00:05 for S1,L, 00:10 for S1,R, etc.). This method allows for verification of the rate at which the RFID reader is moved, as well as the scan path, and degree of RFID tag coverage achieved on the retail fixture.

In this regard, the handheld reader can estimate the scan path 2106 and display the same to the user to determine the path scanned, as well as indicate any missed areas. To do this, the system assumes the user moves the RFID reader 2100 at a predetermined rate (e.g., one foot/second). Using initial point fixture data, the time between scanning successive custom barcode labels is determined whether or not as reasonable. If so, then the system draws a line indicating scan path between the barcode labels 2104 on the display screen of the handheld device 2100. On the otherhand if the time between scans is not reasonable (e.g., the time is greater than a first predefined threshold or lower than a second predefined threshold).

Figure 23A:
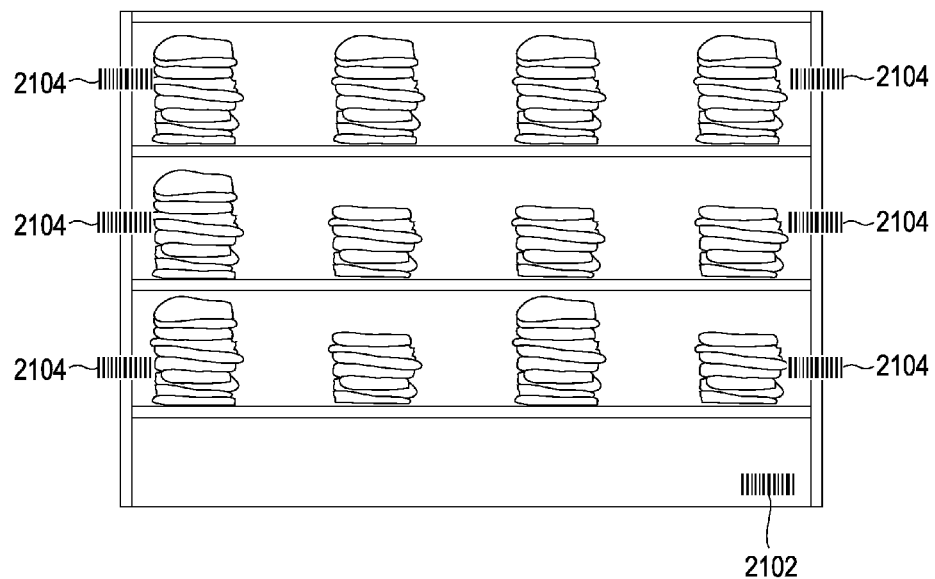
FIG. 23A illustrates a scan trace displayed by an RFID reading terminal using a point-based scan path determination with positions of the decodable indicia similar to that of FIG. 22A in accordance with an embodiment.
Figure 23B:
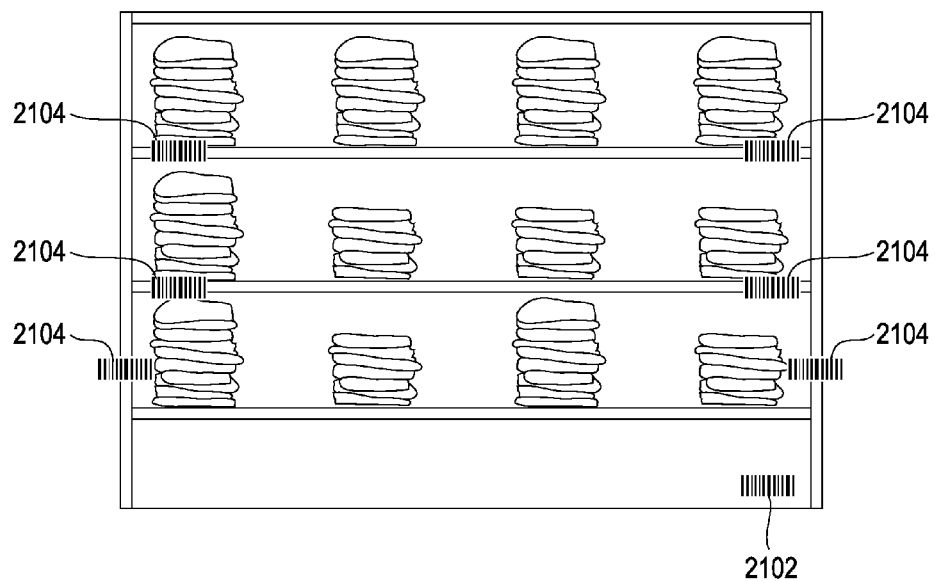
FIG. 23B illustrates a scan trace displayed by an RFID reading terminal using a point-based scan path determination with different positions of the decodable indicia in accordance with an embodiment.

FIG. 23A illustrates the locations of the barcode labels 2104 in accordance with one embodiment. As shown, at least some of the barcode labels 2104 should be placed along the path that the user wishes to scan for RFID tags. For example, the barcode labels 2104 should be on opposing ends of RFID tags that are intended to be scanned since the RFID handheld device should be moved between the two barcode labels 2104, which is also the location of RFID tags.

It should be noted that each of the items shown on the fixture 2101 may have RFID tags even though the RFID tags are not explicitly visible in the Figures. For example, the figures show jeans on the shelves of the fixture 2101 and each pair of jeans may have an RFID tag attached thereto and associated with such pair of jeans. Thus, when each respective RFID tag is scanned and the data from the RFID tag is determined, the user determines that the jeans associated with the scanned RFID tag is present on the inventory.

It is noted that the custom barcode label may be mounted at locations easily acquired with a barcode scanner, such as the edge of the shelf as shown in the Figures. Information encoded in each barcode must match mounting location in accordance with some embodiments. For example, if the barcode data="S1,L" or "Shelf 1, left side", then barcode should be mounted at the left side of the first shelf. Mislocated barcode labels may degrade the accuracy of depicted scan path of handheld RFID reader since the system is preprogrammed with particular locations of the barcode labels.

It should be also noted that the initial point barcode label 2102 may contain a physical, meta-description of the fixture, such as the shape of the fixture, the number of shelves of the fixture, physical dimensions of the fixture, etc. The initial point barcode label 2102 may be used during processing to validate motion between "points" (i.e. custom barcode labels).

The initial point barcode label 2102 may also be used to verify what portion of fixture has been inventoried by handheld RFID reader. The scan path point table (e.g., the table in FIG. 22B) should contain data for all shelves or other areas of the fixture in the correct sequence. For example, in FIG. 22A, S1,L to S2,L indicates shelf #1 was not inventoried, and S1.L to S1.R scanned below a predetermined threshold (e.g., one second) indicates a rate of motion of RFID reader that was too fast and inventory errors are likely since it is likely that interrogation signals were not able to allow the RFID to respond or the RFID reader was unable to read the response due to the movement.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

A small sample of systems, methods, and apparata that are described herein is as follows:

A1. A portable radio-frequency identifier (RFID) reading terminal comprising:

a microprocessor;

a memory;

an RFID reading device comprising a radio frequency (RF) antenna;

a display;

wherein said portable RFID reading terminal is configured to display a scan trace; and wherein said scan trace is provided by a line comprising a plurality of time varying points, each point being defined by a projection of a coverage shape of an RF signal transmitted by said RFID reading device onto a chosen plane at a given moment in time.

A2. The portable RFID reading terminal of (A1), wherein said portable RFID reading terminal is configured, by reading RFID tags attached to said items, to reconcile an inventory of items stored in a facility against at least one of: an expected inventory list, an expected count of items.

A3. The portable RFID reading terminal of (A1), wherein said portable RFID reading terminal is configured , by reading RFID tags attached to said items, to reconcile an inventory of items stored in a facility against at least one of: an expected inventory list, an expected count of items; and wherein said RFID terminal is configured to receive from an external computer at least one of: said expected inventory list, said expected count of items.

A4. The portable RFID reading terminal of (A1), further comprising a user interface;

wherein said portable RFID reading terminal is configured, by reading RFID tags attached to said items, to reconcile an inventory of items stored in a facility against at least one of: an expected inventory list, an expected count of items; and wherein said RFID terminal is configured to receive via said user interface at least one of: said expected inventory list, said expected count of items.

A5. The portable RFID reading terminal of (A1), further comprising a two-dimensional imager;

wherein said portable RFID reading terminal is configured, by reading RFID tags attached to said items, to reconcile an inventory of items stored in a facility against at least one of: an expected inventory list, an expected count of items; and wherein said RFID terminal is configured to receive via said two-dimensional imager at least one of: said expected inventory list, said expected count of items.

A6. The portable RFID reading terminal of (A1), wherein said portable RFID reading terminal is configured, by reading RFID tags attached to said items, to reconcile an inventory of items stored in a facility against at least one of: an expected inventory list, an expected count of items; and wherein said RFID terminal is configured to receive from an external memory device at least one of: said expected inventory list, said expected count of items.

A7. The portable RFID reading terminal of (A1), wherein said portable RFID reading terminal is configured, by reading RFID tags attached to said items, to reconcile an inventory of items stored in a facility against at least one of: an expected inventory list, an expected count of items; and wherein said RFID terminal is configured to receive from a first external computer at least one of: said expected inventory list, said expected count of items; and wherein said RFID terminal is further configured to transmit to a second external computer at least one of: a list of read RFID tags, a count of read RFID tags.

A8. The portable RFID reading terminal of (A1), further comprising a two-dimensional imager;

wherein said portable RFID reading terminal is further configured to determine a spatial position of said RF signal coverage shape based on a known position and orientation of said RF antenna relatively to a position of a field of view of said two-dimensional imager.

A9. The portable RFID reading terminal of (A1), further comprising a two-dimensional imager;

wherein said portable RFID reading terminal is further configured to measure a distance to an object using said two-dimensional imager; and wherein said portable RFID reading terminal is further configured to determine and display a projection of said RF signal coverage shape onto the plane defined by a physical structure.

A10. The portable RFID reading terminal of (A1), further comprising at least one accelerometer;

wherein said portable RFID reading terminal is further configured to determine a change of a spatial position and orientation of said RF signal coverage shape based on proper acceleration values received from said at least one accelerometer.

A11. The portable RFID reading terminal of (A1), wherein said portable RFID reading terminal is further configured to display at least one of: a quantity of scanned items, a quantity of items which have not be scanned yet, a total quantity of items to be scanned.

A 12. The portable RFID reading terminal of (A1), wherein said portable RFID reading terminal is further configured to display an indicator of a ratio of quantity of scanned items to a total quantity of items to be scanned.

A13. The portable RFID reading terminal of (A1), wherein said portable RFID reading terminal is further configured to display said scan trace overlaid over an image of a physical structure.

A14. The portable RFID reading terminal of (A1), wherein said portable RFID reading terminal is further configured to receive an image of a physical structure; and wherein said portable RFID reading terminal is further configured to display said scan trace overlaid over said image of said physical structure.

A15. The portable RFID reading terminal of (A1), wherein said portable RFID reading terminal is further configured to receive a description of a physical structure;

wherein said portable RFID reading terminal is further configured to create an image of said physical structure based on said description; and wherein said portable RFID reading terminal is further configured to display said scan trace overlaid over said image of said physical structure.

A16. The portable RFID reading terminal of (A1), further comprising a two-dimensional imager;

wherein said portable RFID reading terminal is further configured, using said two-dimensional imager, to acquire an image of a physical structure; and wherein said portable RFID reading terminal is further configured to display said scan trace overlaid over said image of said physical structure.

A17. The portable RFID reading terminal of (A1), wherein said portable RFID reading terminal is further configured to display an indicator of an RF signal coverage over said scan trace overlaid over an image of a physical structure.

A18. The portable RFID reading terminal of (A1), wherein said portable RFID reading terminal is further configured to display a indicator of an RF signal coverage over a current position within said scan trace.

The invention claimed is:

1. A system for reading RFID tags, the system comprising:
    a barcode reader that projects a light to read barcodes attached to an object in a predetermined sequential order;
    an RFID reader comprising an antenna that reads RFID tags while the barcode reader moves to sequentially read the barcodes in the predetermined sequential order along the object; and
    wherein an RFID scan path of the object is determined based on scanning the barcodes in the predetermined sequential order.

2. The system of claim 1, wherein a radiation pattern of the RFID reader projects in a direction substantially similar to the direction of the barcode reader laser.

3. The system of claim 1, wherein said portable RFID reading terminal is configured, by reading RFID tags attached to said items, to reconcile an inventory of items stored in a facility against at least one of: an expected inventory list, an expected count of items; and
    wherein said RFID terminal is configured to receive from an external computer at least one of: said expected inventory list, said expected count of items.

4. The system of claim 1, further comprising a user interface;
    wherein said portable RFID reading terminal is configured, by reading RFID tags attached to said items, to reconcile an inventory of items stored in a facility against at least one of: an expected inventory list, an expected count of items; and
    wherein said RFID terminal is configured to receive via said user interface at least one of: said expected inventory list, said expected count of items.

5. The system of claim 1, further comprising a two-dimensional imager;
    wherein said portable RFID reading terminal is configured, by reading RFID tags attached to said items, to reconcile an inventory of items stored in a facility against at least one of: an expected inventory list, an expected count of items; and
    wherein said RFID terminal is configured to receive via said two-dimensional imager at least one of: said expected inventory list, said expected count of items.

6. The system of claim 1, wherein said portable RFID reading terminal is configured, by reading RFID tags attached to said items, to reconcile an inventory of items stored in a facility against at least one of: an expected inventory list, an expected count of items; and
    wherein said RFID terminal is configured to receive from an external memory device at least one of: said expected inventory list, said expected count of items.

7. The system of claim 1, wherein said portable RFID reading terminal is configured, by reading RFID tags attached to said items, to reconcile an inventory of items stored in a facility against at least one of: an expected inventory list, an expected count of items; and wherein said RFID terminal is configured to receive from a first external computer at least one of: said expected inventory list, said expected count of items; and wherein said RFID terminal is further configured to transmit to a second external computer at least one of: a list of read RFID tags, a count of read RFID tags.

8. The system of claim 1, wherein said portable RFID reading terminal is configured, by reading RFID tags attached to said items, to reconcile an inventory of items stored in a facility against at least one of: an expected inventory list, an expected count of items; and wherein said RFID terminal is configured to receive from an external computer at least one of: said expected inventory list, said expected count of items; and wherein said RFID terminal is further configured to transmit to said external computer at least one of: a list of read RFID tags, a count of read RFID tags.

9. The system of claim 1, further comprising a two-dimensional imager;

wherein said portable RFID reading terminal is further configured to determine a spatial position of said RF signal coverage shape based on a known position and orientation of said RF antenna relatively to a position of a field of view of said two-dimensional imager.

10. The system of claim 1, further comprising a two-dimensional imager;

wherein said portable RFID reading terminal is further configured to measure a distance to an object using said two-dimensional imager; and wherein said portable RFID reading terminal is further configured to determine and display a projection of said RF signal coverage shape onto the plane defined by a physical structure.

11. The system of claim 1, further comprising at least one accelerometer;

wherein said portable RFID reading terminal is further configured to determine a change of a spatial position and orientation of said RF signal coverage shape based on proper acceleration values received from said at least one accelerometer.

12. The system of claim 1, wherein said portable RFID reading terminal is further configured to display at least one of: a quantity of scanned items, a quantity of items which have not be scanned yet, a total quantity of items to be scanned.

13. The system of claim 1, wherein said portable RFID reading terminal is further configured to display an indicator of a ratio of quantity of scanned items to a total quantity of items to be scanned.

14. The system of claim 1, wherein said portable RFID reading terminal is further configured to display said scan trace overlaid over an image of a physical structure.

15. The portable RFID reading terminal of claim 1, wherein said portable RFID reading terminal is further configured to receive an image of a physical structure; and wherein said portable RFID reading terminal is further configured to display said scan trace overlaid over said image of said physical structure.

16. The portable RFID reading terminal of claim 1, wherein said portable RFID reading terminal is further configured to receive a description of a physical structure;

wherein said portable RFID reading terminal is further configured to create an image of said physical structure based on said description; and wherein said portable RFID reading terminal is further configured to display said scan trace overlaid over said image of said physical structure.

17. The system of claim 1, further comprising a two-dimensional imager;

wherein said portable RFID reading terminal is further configured, using said two-dimensional imager, to acquire an image of a physical structure; and wherein said portable RFID reading terminal is further configured to display said scan trace overlaid over said image of said physical structure.

18. The system of claim 1, wherein said portable RFID reading terminal is further configured to display an indicator of an RF signal coverage over said scan trace overlaid over an image of a physical structure.

19. The system of claim 1, wherein said portable RFID reading terminal is further configured to display a indicator of an RF signal coverage over a current position within said scan trace.

20. A method of reading RFID tags, comprising:

providing a device that can read barcodes and RFID tags, wherein the barcodes are attached to an object and respectively having a predetermined sequential read order;

while reading the barcodes in the predetermined sequential read order, outputting an interrogation signal to RFID tags so that the RFID tags can be read while the barcode reader moves to sequentially read the barcodes in the predetermined sequential order;

determining a scan path of the RFID reader based on scanning the barcodes in the predetermined sequential order.

* * * * *